United States Patent
Kurtz

(10) Patent No.: US 10,302,030 B2
(45) Date of Patent: May 28, 2019

(54) SYSTEM AND METHOD FOR STARTING A DIESEL ENGINE

(71) Applicant: Ford Global Technologies, LLC, Dearborn, MI (US)

(72) Inventor: Eric Matthew Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/664,751

(22) Filed: Jul. 31, 2017

(65) Prior Publication Data

US 2019/0032581 A1   Jan. 31, 2019

(51) Int. Cl.
| | | |
|---|---|---|
| G06F 19/00 | (2018.01) | |
| F02D 41/00 | (2006.01) | |
| F02D 41/06 | (2006.01) | |
| F02D 41/40 | (2006.01) | |
| F02D 41/30 | (2006.01) | |
| F02M 37/06 | (2006.01) | |
| F02B 75/12 | (2006.01) | |
| F02D 41/38 | (2006.01) | |

(52) U.S. Cl.
CPC ....... *F02D 41/0025* (2013.01); *F02D 41/068* (2013.01); *F02D 41/3082* (2013.01); *F02D 41/405* (2013.01); *F02M 37/06* (2013.01); *F02D 2041/389* (2013.01)

(58) Field of Classification Search
CPC ........... F02D 41/042; F02D 2009/0245; F02D 41/062; F02D 41/064; F02D 41/065; F02D 2001/0075; F02D 2001/167; F02N 11/08
USPC ......................................... 701/103, 112–115
See application file for complete search history.

(56) References Cited

U.S. PATENT DOCUMENTS

| | | | |
|---|---|---|---|
| 6,276,334 B1 | 8/2001 | Flynn et al. | |
| 8,281,772 B2 | 10/2012 | Kurtz et al. | |
| 8,550,060 B2 | 10/2013 | Kurtz et al. | |
| 9,175,661 B2 | 11/2015 | Kurtz et al. | |
| 2007/0256648 A1* | 11/2007 | Sun | F02D 19/081 123/1 A |
| 2008/0022965 A1* | 1/2008 | Bysveen | F02D 19/0647 123/294 |
| 2010/0287819 A1* | 11/2010 | Buczynsky | C10L 1/08 44/300 |
| 2012/0005950 A1* | 1/2012 | Griffiths | C10L 1/1855 44/338 |
| 2014/0156173 A1* | 6/2014 | Hoda | F02D 41/0025 701/104 |
| 2014/0182192 A1* | 7/2014 | Brewer | C10L 10/12 44/322 |

* cited by examiner

*Primary Examiner* — John Kwon
(74) *Attorney, Agent, or Firm* — Julia Voutyras; McCoy Russell LLP

(57) ABSTRACT

Methods and systems for starting and stopping a diesel engine are presented. In one example, a cetane enhancer is selectively mixed with diesel fuel to provide a cetane enhanced diesel fuel. A diesel engine may be supplied the cetane enhanced diesel fuel after an engine cold start to improve catalyst light off time and engine emissions.

13 Claims, 4 Drawing Sheets

SYSTEM AND METHOD FOR STARTING A DIESEL ENGINE

BACKGROUND/SUMMARY

A diesel engine may be supplied with different types of diesel fuel that range from low cetane number diesel fuel to high cetane number diesel fuel. Higher cetane number diesel fuels exhibit shorter ignition delays (e.g., an amount of time between start of injecting fuel to a cylinder during a cycle of the cylinder to a pressure increase due to onset of combustion of the injected fuel) while lower cetane number diesel fuels exhibit longer ignition delays. If an engine is started with lower cetane number diesel fuels at colder engine temperatures, it may take longer to heat a catalyst coupled to the engine because of combustion stability limits. Further, hydrocarbon emissions may degrade at lower engine temperatures if lower cetane fuel is supplied to the engine. On the other hand, the engine may perform well after it is warm and combusting the lower cetane fuel. Therefore, it may be desirable to provide a way of improving engine cold starting after a vehicle's fuel tank is filled with lower cetane fuel.

The inventor herein has recognized the above-mentioned disadvantages and has developed an engine method, comprising: mixing a cetane enhancing fluid with diesel fuel having a first cetane number to provide diesel fuel having a second cetane number; pumping the diesel fuel having the second cetane number to a high pressure fuel pump via a low pressure fuel pump; and injecting the diesel fuel having the second cetane number to an engine in response to starting the engine when a catalyst temperature is less than a threshold.

By mixing a cetane enhancing fluid with diesel fuel, pumping the mixture to a high pressure pump, and injecting the fuel mixture to an engine in response to starting an engine and catalyst temperature being less than a threshold, it may be possible to reduce engine emissions and improve catalyst light off time after an engine start. In particular, fuel injection timing may be retarded when cetane enhanced diesel fuel is injected to an engine after an engine start since combustion stability may be improved. The retarded fuel injection timing may reduce catalyst light off time and higher cetane fuel may reduce hydrocarbon emissions while fuel injection timing is retarded from nominal fuel injection timing (e.g., fuel injection timing at a present engine speed and engine output torque during warm engine operating conditions).

The present description may provide several advantages. Specifically, the approach may reduce engine emissions. In addition, the approach may improve engine combustion stability during cold engine operating conditions. Further, the approach may provide enhanced engine starting characteristics for engines that have a single fuel injector for each engine cylinder.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
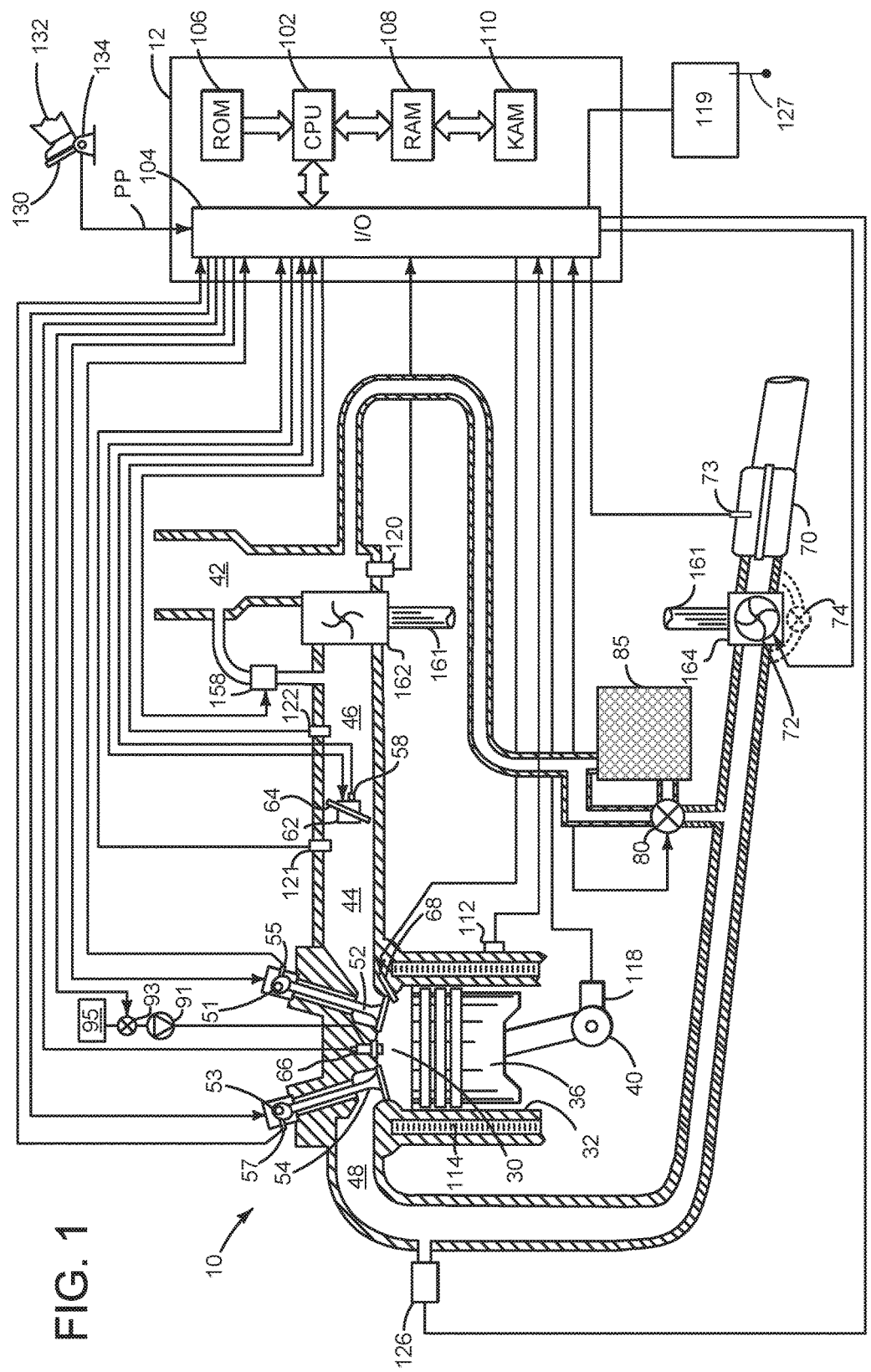
FIG. 1 shows a schematic depiction of an engine.
Figure 2:
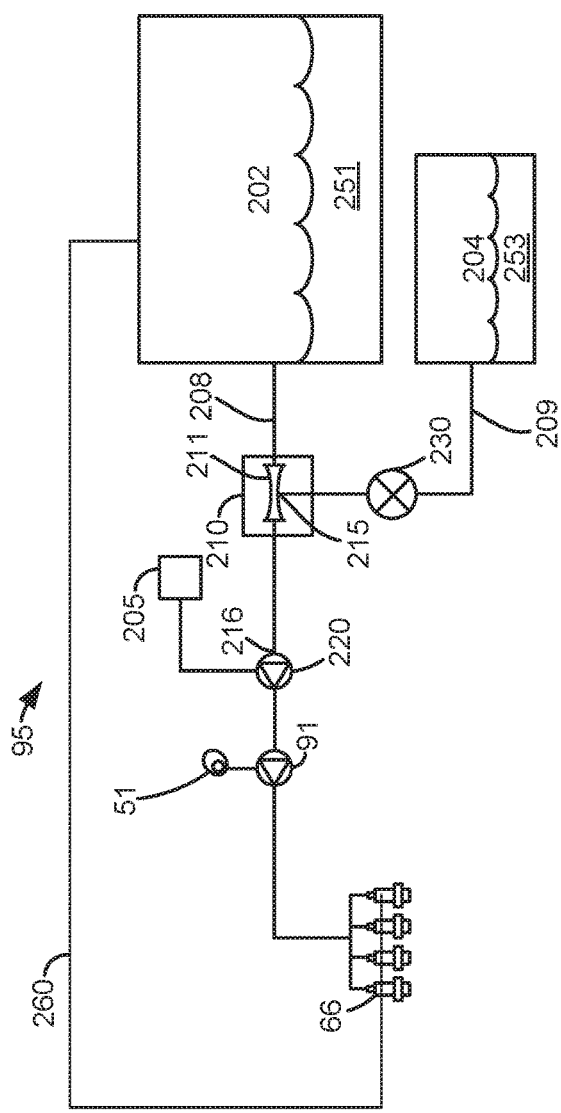
FIG. 2 shows an example fuel system for the engine of FIG. 1.
Figure 3:
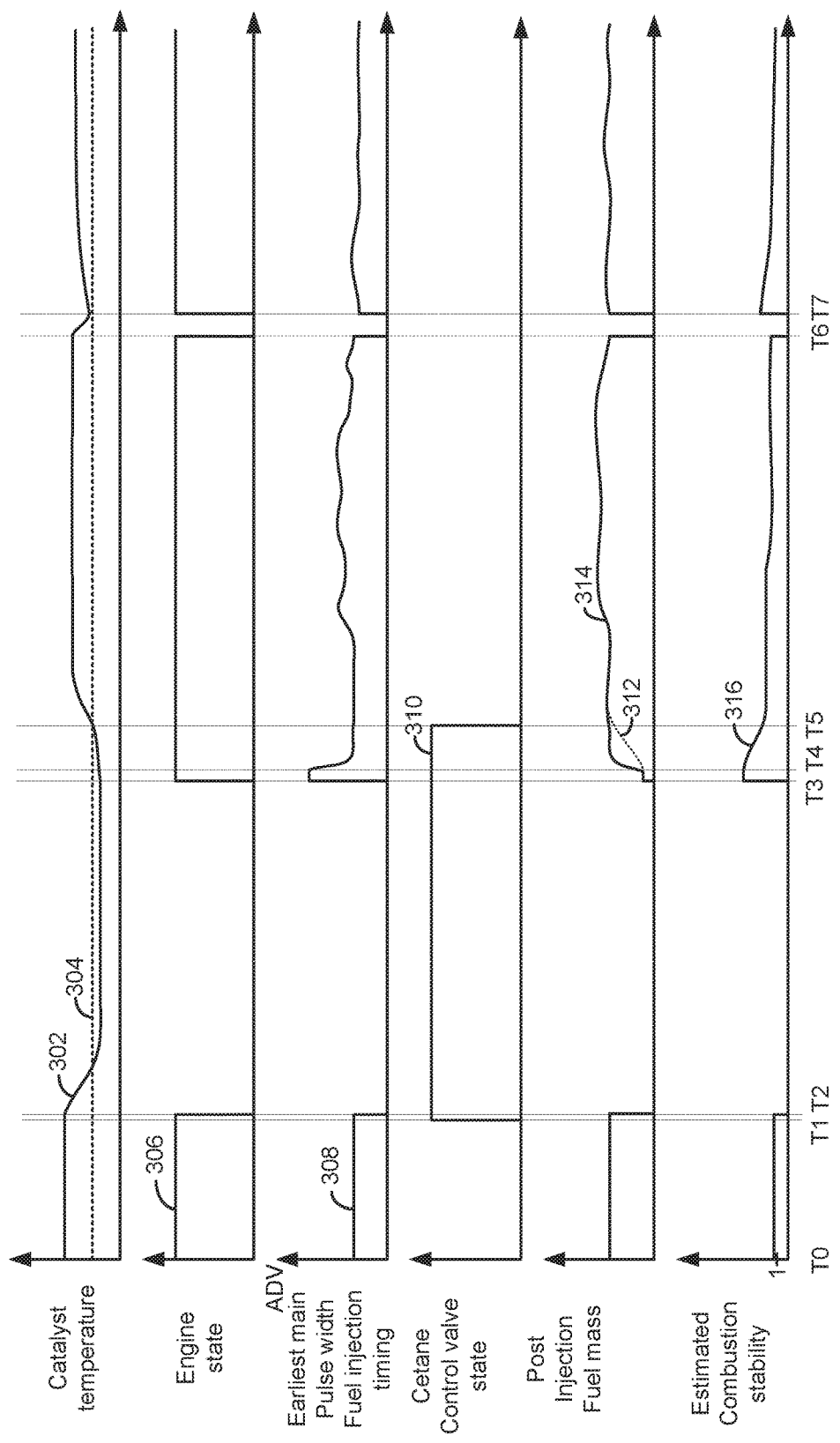
FIG. 3 shows an example engine operating sequence according to the method of FIG. 4 and system of FIGS. 1 and 2.

The present description is related to improving cold starting of a diesel engine. FIG. 1 shows one example of a boosted diesel engine where the method of FIG. 4 may adjust engine actuators to improve engine emissions, performance, and/or fuel economy during engine starting. FIG. 2 shows an example fuel system that supplies fuel to the engine of FIG. 1. FIG. 3 shows an example engine operating sequence according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal FPW from controller 12. Fuel is delivered to fuel injector 66 by a fuel system including a fuel tank 95, high pressure fuel pump 91, fuel pump control valve 93, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, waste gate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Combustion is initiated in combustion chamber 30 when fuel and air ignite via compression ignition when piston 36 is near top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include an oxidation catalyst and particulate filter, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF). Emissions device temperature may be estimated or determined via sensor 73.

Exhaust gas recirculation (EGR) may be provided to the engine via EGR valve 80. EGR valve 80 is a three-way valve that closes or allows exhaust gas to flow from upstream of emissions device 70 to a location in the engine air intake system upstream of compressor 162. EGR may bypass EGR cooler 85, or alternatively, EGR may be cooled via passing through EGR cooler 85. In other, examples high pressure and low pressure EGR system may be provided.

Vehicle navigation system 119 includes a global positioning receiver 127 and it may store selected positions such as home (e.g., the vehicle's base position, which may be where the vehicle owner lives or conducts business), work, shopping locations, etc. for estimating an amount of time the vehicle's engine may be stopped. Further, it may also provide vehicle position information to controller 12 via a CAN communication link. The vehicle position information may include but is not limited to present vehicle position, home location, work location, and shopping locations.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, an example vehicle fuel system 95 is shown for supplying fuel to engine 10 of FIG. 1. Diesel fuel 251 is stored in fuel storage tank 202. Cetane enhancer 253 is stored in cetane storage tank 204. Diesel fuel may be drawn to mixing device 210 via low pressure fuel pump 220 and conduit 208. Cetane enhancer 253 may be drawn to mixing device 210 via low pressure fuel pump 220 and conduit 209 when valve 230 is open. Diesel fuel may solely be drawn to device 210 via low pressure fuel pump when valve 230 is closed. In one example, fuel mixing device may include venturi 211 through which diesel fuel 251 may flow. Cetane enhancer 253 may be drawn into venturi 211 via a low pressure port 215. The diameter of low pressure port 215 may be sized to provide a proportional flow rate of cetane enhancer 253 to a given flow rate of diesel fuel through venturi 211. For example, a flow rate of X grams of diesel fuel through venturi 211 may draw $0.001 \cdot X$ grams of cetane enhancer through venturi 211. Thus, the amount of cetane enhancer 253 mixed with diesel fuel 251 may be increased or decreased with the amount of diesel fuel 251 flowing through venturi 211. In other examples, a different type of mixing device may be provided (e.g. a mixing tube with baffles). Cetane enhanced diesel fuel may be drawn to low pressure fuel pump 220 via a low pressure at an inlet 216 of low pressure fuel pump 220. Low pressure fuel pump 220 may be electrically driven via battery 205. Cetane enhanced diesel fuel is delivered to high pressure fuel pump 91 via low pressure fuel pump 220, and fuel pump 91 may supply the cetane enhanced diesel fuel to fuel injectors 66. High pressure fuel pump 91 may be mechanically driven via camshaft 51.

Fuel that is delivered to fuel injectors 66 but not injected may be returned to fuel tank 202 via return line 260. In one example, by delivering a fuel injector command pulse that is less than a threshold duration, fuel injectors may be commanded open without actually opening. Fuel injectors 66 do not open if the fuel command pulse is shorter than a threshold duration because there may be insufficient field strength in fuel injector coils to operate internal fuel injector components. If a fuel injector is commanded open, but fails to open, fuel in the injector may be returned back to fuel tank 202.

In this way, cetane enhancer may be mixed with diesel fuel to provide cetane enhanced diesel fuel. The cetane enhanced diesel fuel may improve engine combustion stability at lower engine temperatures and it may also reduce engine emissions.

The system of FIGS. 1 and 2 provides for an engine system, comprising: a compression ignition engine; a cetane enhancer storage tank; a diesel fuel storage tank; a low pressure fuel pump; a high pressure fuel pump; and a fuel injector directly injecting fuel into the combustion chamber; and a control system including executable instructions stored in non-transitory memory to mix cetane enhancer stored in the cetane enhancer tank with diesel fuel stored in the diesel fuel storage tank to provide a cetane enhanced diesel fuel, and instructions to pump the cetane enhanced diesel fuel from the low pressure fuel pump to the high pressure fuel pump in response to an engine start request. The engine system further comprises additional instructions to estimate a catalyst temperature at a time of a next engine start after an engine stop. The engine system further comprises additional instructions to mix the cetane enhancer with the diesel fuel in response to the estimated catalyst temperature at the time of the next engine start being less than a threshold. The engine system further comprises additional instructions to inject the cetane enhanced diesel fuel via the fuel injector. The engine system further comprises additional instructions to advance fuel injection timing while injecting the diesel fuel stored in the diesel fuel storage tank during an engine start.

Figure 4:
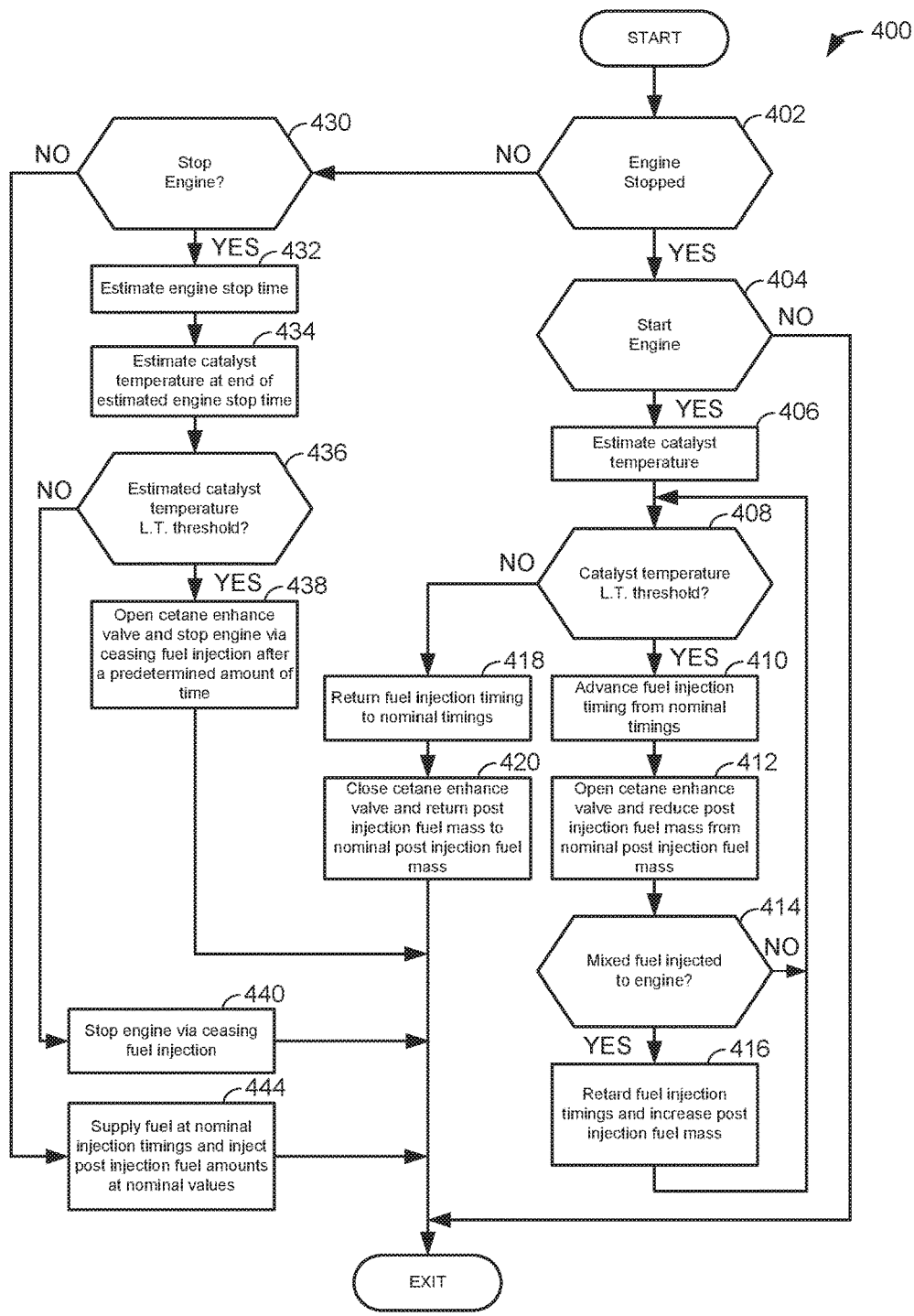
FIG. 4 shows a flowchart of an example method for operating an engine.

Referring now to FIG. 3, an example engine operating sequence according to the method of FIG. 4 is shown. The engine operating sequence may be provided via the system shown in FIGS. 1 and 2.

The first plot from the top of FIG. 3 represents catalyst temperature (e.g., 70 of FIG. 1) versus time. The vertical axis represents catalyst temperature and catalyst temperature increases in the direction of the vertical axis arrow. Trace 302 represents the catalyst temperature level. The horizontal axis represents time and time increases from the left side of the figure to the right side of the figure. Horizontal line 304 represents a threshold catalyst temperature. In one example, the threshold catalyst temperature is a catalyst light off temperature (e.g., a temperature at which the catalyst conversion efficiency is greater than 50% when a prescribed gas mixture enters the catalyst).

The second plot from the top of FIG. 3 represents engine operating state versus time. The vertical axis represents engine operating state and the engine is operating (e.g., combusting air and fuel) when trace 306 is at a higher level near the vertical axis arrow. The engine is not operating when trace 306 is near the horizontal axis. The horizontal axis represents time and time increases from the left side of the figure to the right side of the figure.

The third plot from the top of FIG. 3 represents timing of earliest fuel injection during a cycle of a cylinder versus time. The vertical axis represents timing of earliest fuel injection (e.g., 10 crankshaft degrees before top dead center compression stroke) and timing of the earliest fuel injection advances (e.g., moves from 5 crankshaft degrees before top dead center compression stroke to 10 crankshaft degrees before top dead center compression stroke) in the direction of the vertical axis arrow. Fuel injection timing at the horizontal axis is a predetermined fuel injection timing (e.g., top dead center compression stroke). Trace 308 represents earliest fuel injection timing for cycle of a cylinder.

The earliest fuel pulse fuel injection timing during an engine cycle may be start of fuel injection timing of pilot fuel injections or it may be start of fuel injection timing for main fuel injections. Pilot injections are short duration fuel injections that may be less than 4 mg. Pilot fuel injections start and end before top-dead-center compression stroke in the cylinder cycle in which they are injected. The pilot fuel injections may reduce engine combustion noise, control peak cylinder pressures, and adjust heat release within the cylinder. Main fuel injections are injections of a greatest amount of fuel during a cylinder cycle. The main fuel injections may range from 3 mg to 100 mg per cylinder cycle. Pilot fuel injections precede the main fuel injections. Early post fuel injections may occur ten crankshaft degrees after top dead center compression stroke and after a main fuel injection. Early post fuel injections may range from 1 mg to 10 mg. Late post injections are fuel injections that are preformed after combustion of the main fuel injection pulse is complete and before an exhaust valve of the cylinder receiving the fuel closes during the cylinder cycle. Early and late post injections may be useful for regenerating emissions control devices in the engine's exhaust system.

The fourth plot from the top of FIG. 3 represents cetane control valve state versus time. The cetane control valve is open when trace 310 is at a higher level near the vertical axis arrow. The cetane control valve is closed when trace 310 is not visible. The vertical axis represents time and time increases from the left to the right side of the figure.

The fifth plot from the top of FIG. 3 represents post injection fuel mass versus time. The post injection fuel mass is increased in the direction of the vertical axis arrow. The horizontal axis represents time and time increases from the left to the right side of the figure. Trace 312 represents post injection fuel mass if diesel fuel without cetane enhancer is injected during engine cold starting. The post injection fuel mass is equal to trace 314 when only trace 314 is visible. Trace 314 represents post injection fuel mass according to the method of FIG. 4.

The sixth plot from the top of FIG. 3 represents estimated combustion stability versus time. In one example, estimated combustion stability may be covariance of indicated mean effective cylinder pressure (IMEP), where a value of one indicates a high combustion stability and values in excess of one indicate increasing degradation of combustion stability. In an alternative example, combustion stability may be estimated from engine speed variation. The horizontal axis represents time and time increases from the left side of the figure to the right side of the figure. Trace 316 represents estimate combustion stability.

At the time T0, the engine is operating as indicated by the engine state trace being at a higher level. The catalyst temperature is greater than threshold 304 and the earliest fuel injection timing for a cycle of a cylinder, each cylinder fuel injection timing at similar times (not shown), at a lower middle level. The cetane control valve is closed and the post injection fuel mass is at a middle level. The estimated engine combustion stability is good and near a value of one.

At time T1, a request to stop the engine is made (not shown); however, the engine continues to operate for a predetermined amount of time that may vary with engine temperature, ambient temperature, and vehicle type. The cetane control valve is opened to allow cetane enhancer to mix with diesel fuel and the low pressure fuel pump draws cetane enhancer from the cetane enhancer tank to a mixing device where the cetane enhancer is mixed with the diesel fuel. By mixing cetane enhancer with diesel fuel just before the engine stops, it may take less time before the cetane enhanced fuel is injected to the engine during a next engine restart after the present engine stop. The cetane control valve may be opened in response to an expected or anticipated catalyst temperature when the engine is anticipated or expected to be restarted. The catalyst temperature remains at its same level and the earliest fuel injection time remains at its same level. The post injection fuel mass remains at its previous level, and engine combustion stability remains at its previous value.

At the time T2, the engine is stopped in response to the request to stop the engine as indicated by the engine state transitioning to a lower level. The catalyst temperature begins to decline and the earliest fuel injection time is zero since fuel is not injected to the engine. The cetane control valve is held open, although it may be closed if the cetane control valve is a normally closed valve, and the post fuel injection mass is zero since fuel is not injected to the stopped engine. Combustion stability is zero since the engine is not operating.

At the time T3, the engine is restarted in response to an engine start request (not shown) as indicated by the engine state trace 306 transitioning from a lower level to a higher level. The earliest fuel injection time in cylinder cycles is advanced considerably in response to diesel fuel being injected to the engine and the engine being cold started (e.g., catalyst temperature less than a threshold). The cetane control valve remains open and the post fuel injection mass is smaller than the post fuel injection amount if the engine were injected with cetane enhanced fuel. The post fuel injection mass is reduced and the earliest main fuel injection pulse width injection time is advanced to ensure a desired level of combustion stability, CO emission, and unburned HC emissions. The estimated engine combustion stability degrades, but it is an improvement over engine combustion stability if the earliest fuel injection time were not advanced.

At the time T4, the cetane enhanced fuel begins to be injected to the engine. The catalyst temperature continues to increase and the earliest fuel injection time begins to be retarded since the cetane enhanced fuel improves combustion stability such that a higher level of fuel injection retard and combustion phase retard may be tolerated by the engine. The cetane valve remains open and the post fuel injection mass is increased. Increasing the post injection mass increases exhaust bast temperature to reduce catalyst light-off time. The combustion stability begins to improve as the cetane injected fuel is injected to the cylinders.

At time T5, catalyst temperature exceeds threshold 304 and the cetane control valve is closed in response to the catalyst temperature exceeding threshold 304. The engine continues operating and the earliest fuel injection timing has been adjusted to nominal or baseline timing for warm engine operating at the present engine speed and load. Likewise, the post fuel injection mass has been adjusted to nominal or baseline timing for warm engine operating at the present engine speed and load. The estimated engine combustion stability has returned to a good level.

At time T6, an engine stop request is made and the engine is stopped (e.g., not rotating and combusting air and fuel) as indicated by the engine state trace 306 transitioning to a lower level. The earliest fuel injection in a cycle of a cylinder is zero when the engine stops. The cetane valve remains closed and the post injection fuel mass is also decreased to zero. The simulated combustion stability is zero since the engine is stopped.

At time T7, the engine is restarted in response to an engine start request (not shown). The catalyst temperature is greater than threshold 304 so the cetane control valve is not opened and cetane enhancer is conserved. The earliest fuel injection time is at a baseline or nominal level (not advanced or retarded) for the engine at its present speed and load. Likewise, the post injection fuel mass is at a baseline or nominal level for the engine at its present speed and load. Combustion stability is at a good level (e.g., near a value of one).

Thus, cetane enhancer may be added to diesel fuel during a cold engine start to improve engine operation and emissions. Further, the cetane enhancer may not be added to the diesel fuel during a warm engine start when additional engine combustion stability may not be needed with the diesel fuel.

Referring now to FIG. 4, a flowchart of a method for operating a diesel engine is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 judges whether or not the engine has stopped rotating. In one example, method 400 senses engine position and if no change of engine position is detected, method 400 may judge that engine rotation is stopped. If method 400 judges that engine rotation is stopped, the answer is yes and method 400 proceeds to 404. Otherwise, the answer is no and method 400 proceeds to 430.

At 404, method 400 judges whether or not an engine start is requested or desired. An engine may be started responsive to a human driver's request or in response to vehicle operating conditions after the engine has been automatically stopped. A driver may request an engine start via a key switch, proximity sensor, or other input. If method 400 judges that an engine start is desired or requested, the answer is yes and method 400 proceeds to 406. Otherwise, the answer is no and method 400 proceeds to exit.

At 406, method 400 estimates catalyst temperature. In one example, catalyst temperature may be estimated via an estimate of engine exhaust temperature and catalyst exotherm temperature. The engine exhaust temperature may be estimated via engine speed, engine load, and engine air-fuel ratio. The catalyst exotherm temperature may be estimated from engine air-fuel ratio and rate of mass flow through the engine. The catalyst exotherm and the engine exhaust temperature may be added together and then low pass filtered via a first order filter (e.g., $y(i)=x(i)\cdot\alpha+(1-\alpha)\cdot y(i-1)$) to provide an estimate of catalyst temperature. The factor $\alpha$ may be adjusted for ambient temperature and it represents a filtering factor that may increase or decrease the time constant of the filter. The variable $y(i)$ represents present output of the filter, $y(i-1)$ is past output of the filter, and $x(i)$ is present filter input. Of course, other known methods to estimate catalyst temperature may be used. Alternatively, actual catalyst temperature may be measured via a sensor. Method 400 proceeds to 408.

At 408, method 400 judges whether or not catalyst or after treatment device temperature is less than (L.T.) a threshold. In one example, the threshold temperature may be a catalyst light off temperature (e.g., a temperature at which catalyst efficiency is greater than 50% for a given ratio of gases entering the catalyst). If method 400 judges that catalyst temperature is less than a threshold, the answer is yes and method 400 proceeds to 410. Otherwise, the answer is no and method 400 proceeds to 418.

At 410, method 400 advances fuel injection start of injection timing for pilot, main, and post fuel injections relative to base or nominal fuel injection timings. For example, if base or nominal fuel injection timing (e.g., start of fuel injection timing for warmed up engine operation at a particular engine speed and torque output) for a main fuel pulse during an engine cycle for engine speed of 1200 RPM and engine torque output of 200 N-m is 10 crankshaft degrees before top dead center compression stroke for each cylinder cycle, start of fuel injection timing for the main fuel injection pulse for the cylinder cycle may be advanced to 12 crankshaft degrees before top dead center compression stroke. In one example, the amount of fuel injection advance may be empirically determined and it may be based on a desired combustion stability level. For example, when the engine is first started and diesel fuel that is not cetane enhanced is injected to the engine, spark timing may be advanced four crankshaft degrees to provide a desired combustion stability value of 1.08. The amount of fuel injection advance may be stored in controller memory and it may be used to adjust fuel injection timing responsive to catalyst and/or engine temperature. By advancing fuel injection timing when diesel fuel that is not cetane enhanced is injected to the engine, it may be possible to provide a desired level of combustion stability when the engine and catalyst are cold since combustion phasing (e.g., location of peak cylinder pressure) may be more advanced. Alternatively, the post fuel injections may be advanced in place of advancing man fuel injection pulse widths. Method 400 proceeds to 412 after fuel injection timing is advanced.

At 412, method 400 opens a cetane enhancing valve (e.g., 230 of FIG. 2) to allow cetane enhancer to flow toward engine fuel injectors from the cetane enhancer tank. By mixing cetane enhancer with diesel fuel, the cetane number of the diesel fuel may be increased to provide a higher cetane fuel. In addition, method 400 reduces an amount of post injection fuel mass injected to the engine cylinders from nominal conditions. For example, if the post injection fuel mass is 3 mg per cylinder cycle for each cylinder at an engine speed of 1200 RPM and engine torque output of 200 N-m for a warmed up engine (e.g., nominal conditions at 1200 RPM and 200 N-m torque output), the post injection fuel mass may be reduced to 2 mg per cylinder cycle for each cylinder. The post injection fuel mass may be supplied in one or more fuel pulses during an engine cycle. By reducing the post injection fuel mass, engine combustion stability and engine hydrocarbon and CO emissions may be improved or reduced while operating the engine with diesel fuel that has not been enhanced with cetane additive.

Alternatively, or in addition, if desired, fuel injectors 66 may be commanded open with a fuel injection pulse width that is too short to open the fuel injectors. Fuel in the fuel injectors may then be returned to the fuel tank so as to purge fuel lines without having to operate the engine with lower cetane fuel when the engine is cold. Method 400 proceeds to 414.

At 414, method 400 judges whether or not cetane enhanced fuel is being injected to the engine. In one example, method 400 judges that cetane enhanced fuel is being injected to the engine after a predetermined amount or volume of fuel has been injected to the engine (e.g., 200 mg). The predetermined amount of fuel may be equivalent to the amount or volume of fuel in the fuel system between the low pressure fuel pump and engine fuel injectors. In other examples, method 400 may judge that cetane enhanced fuel is being injected to the engine when engine combustion stability reaches a predetermined threshold. In one example, the predetermined threshold is responsive to vehicle occupant sensitivity to engine noise and vibration. If method 400 judges that mixed fuel (e.g., cetane enhanced diesel fuel or a mixture of diesel fuel and cetane enhancer) is being injected to the engine, the answer is yes, and method 400 proceeds to 416. Otherwise, the answer is no and method 400 returns to 408.

Thus, method 400 may to adjust fuel injection timing in response to an estimate of when the cetane enhanced diesel fuel is injected to an engine cylinder, the estimate based on a volume of fuel injected and a fuel system volume. Method 400 may command one or more fuel injectors with a fuel pulse width that is too short in duration to open the fuel injectors so that diesel fuel is returned to the diesel fuel storage tank so that the fuel lines may be purged of lower cetane fuel before the engine is operated or to reduce the amount of time the engine is operated with low cetane fuel.

At 416, method 400 retards start of fuel injection timings from fuel injection starting timings that are advanced from nominal fuel injection timings. The start of fuel injection timings may be retarded from nominal start of fuel injection timings for the present engine speed and torque output or the start of fuel injection timings may be slightly advanced from nominal start of fuel injection timings but retarded from the start of fuel injection timings described at 410. Further, method 400 increases the post injection fuel mass injected to engine cylinders to a fuel mass greater than the post injection fuel mass determined at 412 for a same engine speed and engine torque. Thus, method 400 retards start of fuel injection timing for pilot, main, and post fuel injections to each engine cylinder and increases mass of post fuel injection when cetane enhanced fuel starts to be injected to the engine. The higher cetane fuel allows for more retarded combustion phasing so that engine exhaust temperature and enthalpy may be increased. The higher engine exhaust temperature and enthalpy may assist in reducing catalyst light off time so that vehicle output emissions may be reduced. Method 400 returns to 408.

At 418, method 400 returns fuel injection start of injection timing for pilot, main, and post fuel injections to base or nominal fuel injection timings. For example, if start of fuel injection timing for presently operating the engine at an engine speed of 1200 RPM and engine torque output of 200 N-m is 12 crankshaft degrees before top dead center compression stroke for each cylinder cycle, start of fuel injection timing may be returned to a nominal 10 crankshaft degrees before top dead center compression stroke. Method 400 proceeds to 420 after start of fuel injection timing is returned to its nominal or base timing.

At 420, method 400 closes a cetane enhancing valve (e.g., 230 of FIG. 2) to cease flow of cetane enhancer toward engine fuel injectors from the cetane enhancer tank. In addition, method 400 returns an amount of post injection fuel mass injected to the engine cylinders to a nominal post fuel injection amount. For example, if the post injection fuel mass is 3 mg per cylinder cycle for each cylinder at an engine speed of 1200 RPM and engine torque output of 200 N-m for a warmed up engine (e.g., nominal conditions at 1200 RPM and 200 N-m torque output), the post injection fuel mass may be returned to 3 mg per cylinder cycle for each cylinder. Method 400 proceeds to exit.

At 430, method 400 judges whether or not an engine stop is requested. An engine stop (e.g., stop engine rotation and combustion) may be performed in response to vehicle occupants requesting an engine stop or automatic engine stop conditions being present. For example, an engine stop request may be made when the vehicle's accelerator pedal is not depressed and when the vehicle's motion is stopped. Additional, vehicle operating conditions may also have to be present to request an engine stop. If method 400 judges that an engine stop (e.g., cease combustion and engine rotation) is requested, the answer is yes and method 400 proceeds to 432. Otherwise, the answer is no and method 400 proceeds to 444.

At 432, method 400 estimates an amount of time the engine and vehicle are anticipated to be stopped. In one example, method 400 may estimate an amount of time an engine is expected to be stopped based on the vehicle's present position and the vehicle's past history. For example, if the vehicle is driven to its owner's place of work and parked, it may be judged that the engine will be stopped for nine hours according to prior amounts of time when the vehicle was parked at its owner's place of work. Similarly, if the vehicle is driven to its owner's home and parked after being at the owner's work, the engine stop time may be estimated to be eight hours or more using previous engine stopping time data of the engine for the home location. If the vehicle's present stopping position is not a common stopping position, it may be estimated that the engine will be stopped for a short period of time (e.g., less than ten minutes). Likewise, if the vehicle is determined to be located at a store or service station, the estimated engine stopping time may be short (e.g., less than ten minutes). Method 400 proceeds to 434.

At 434, method 400 estimates catalyst temperature. In one example, method 400 estimates catalyst temperature using a known catalyst model such as the one described at 432. The catalyst model estimates catalyst temperature as catalyst temperature after the engine is stopped for the amount of time determined at 432 using the present catalyst temperature and time determined at 432. Thus, the low pass filter described at 406 may be iteratively solved to estimate catalyst temperature the predicted amount of time after the engine is stopped. Method 400 proceeds to 436.

At 436, method 400 judges if the catalyst temperature estimated at 434 is less than (L.T.) a threshold temperature. In one example, the threshold temperature is the catalyst's light off temperature. If method 400 judges that the estimated catalyst temperature is less than the threshold, the answer is yes and method 400 proceeds to 438. Otherwise, the answer is no and method 400 proceeds to 440.

At 438, method 400 opens the cetane enhancing valve (e.g., 230 of FIG. 2) to allow cetane enhancer to flow toward engine fuel injectors from the cetane enhancer tank. In addition, method 400 stops the engine after a predetermined amount of time. The engine may be stopped via ceasing fuel injection to the engine. The predetermined amount of time may be based on experimentally determined data that vehicle occupants provide to indicate appropriate engine stopping delay time. For example, vehicle occupants may indicate that a one second delay is acceptable but a ten second delay is unacceptable. The cetane enhancing valve may remain in an open state when engine rotation is stopped. Method 400 proceeds to exit.

At 440, method 400 stops engine rotation via ceasing fuel flow to the engine. The fuel flow may be ceased by closing fuel injectors and ceasing operation of the low pressure fuel pump. The cetane enhancing valve is held closed so that cetane enhancer is not allowed to mix with diesel fuel and flow to the engine. Method 400 proceeds to exit.

At 444, method 400 supplies diesel fuel without cetane enhancer responsive to engine speed and driver demand torque or engine output torque. The diesel fuel is supplied at nominal or base fuel injection timings and fuel injection amounts that are empirically determined and stored in controller memory. The nominal fuel injection amounts and timings may be determined via operating a similar engine coupled to a dynamometer and adjusting fuel injection amounts and timings until desired engine emissions and performance is provided. Method 400 proceeds to exit.

Thus, the method of FIG. 4 may provide an engine method, comprising: mixing a cetane enhancing fluid with diesel fuel having a first cetane number to provide diesel fuel having a second cetane number; pumping the diesel fuel having the second cetane number to a high pressure fuel pump via a low pressure fuel pump; and injecting the diesel fuel having the second cetane number to an engine in response to starting the engine when a catalyst temperature is less than a threshold. The method includes where the cetane enhancing fluid is comprised from one of alkyl nitrates, peroxides, tetrazoles, and thioaldehydes. The method includes where mixing a cetane enhancing fluid with diesel fuel having a first cetane number includes pumping the cetane enhancing fluid from a cetane enhancer tank and pumping the diesel fuel having the first cetane number from a diesel fuel tank. The method includes where the mixing the cetane enhancing fluid includes mixing the cetane enhancing fluid and the diesel fuel having a first cetane number via a venturi. The method includes where the mixing the cetane enhancing fluid includes opening a valve between a venturi and the cetane enhancer tank. The method includes where the low pressure fuel pump is electrically driven. The method includes where the high pressure fuel pump is mechanically driven via the engine.

The method of FIG. 4 also provides for an engine method, comprising: mixing a cetane enhancing fluid with diesel fuel having a first cetane number to provide diesel fuel having a second cetane number and pumping the diesel fuel having the second cetane number to a high pressure fuel pump via a low pressure fuel pump in response to a request to stop an engine when an estimated catalyst temperature for a next engine start is less than a threshold, stopping the engine, and continuing to mix the cetane enhancing fluid with the diesel fuel having the first cetane number in response a request to start the engine. The method further comprises injecting the diesel fuel having the second cetane number to the engine in response to the request to start the engine. The method includes where stopping the engine includes ceasing to mixt the cetane enhancing fluid with the diesel fuel having the first cetane number. The method further comprises not mixing the cetane enhancing fluid with the diesel fuel having the first cetane number in response to the request to stop the engine when the estimated catalyst temperature for the next engine start is greater than the threshold. The method includes where the estimated catalyst temperature for the next engine start is determined in response to an engine stop request. The method further comprises ceasing to mix the cetane enhancing fluid with the diesel fuel having the first cetane number after an engine start in response to catalyst temperature greater than a threshold. The method further comprises advancing fuel injection timing from nominal fuel injection timing while diesel fuel having the first cetane number is injected to the engine during the next engine start. The method further comprises reducing an amount of post injected fuel from a nominal amount of post injected fuel while diesel fuel having the first cetane number is injected to the engine during the next engine start.

As will be appreciated by one of ordinary skill in the art, the methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine method, comprising:
mixing a cetane enhancing fluid with diesel fuel having a first cetane number to provide diesel fuel having a second cetane number and pumping the diesel fuel having the second cetane number to a high pressure fuel pump via a low pressure fuel pump in response to a request to stop an engine when an estimated catalyst temperature for a next engine start is less than a threshold, stopping the engine, and continuing to mix the cetane enhancing fluid with the diesel fuel having the first cetane number in response a request to start the engine.

2. The method of claim 1, further comprising injecting the diesel fuel having the second cetane number to the engine in response to the request to start the engine.

3. The method of claim 1, where stopping the engine includes ceasing to mix the cetane enhancing fluid with the diesel fuel having the first cetane number.

4. The method of claim 1, further comprising not mixing the cetane enhancing fluid with the diesel fuel having the first cetane number in response to the request to stop the engine when the estimated catalyst temperature for the next engine start is greater than the threshold.

5. The method of claim 1, where the estimated catalyst temperature for the next engine start is determined in response to an engine stop request.

6. The method of claim 1, further comprising ceasing to mix the cetane enhancing fluid with the diesel fuel having the first cetane number after an engine start in response to catalyst temperature greater than a threshold.

7. The method of claim 1, further comprising advancing fuel injection timing from nominal fuel injection timing while diesel fuel having the first cetane number is injected to the engine during the next engine start.

8. The method of claim 7, further comprising reducing an amount of post injected fuel from a nominal amount of post injected fuel while diesel fuel having the first cetane number is injected to the engine during the next engine start.

9. An engine system, comprising:
a compression ignition engine;
a cetane enhancer storage tank;
a diesel fuel storage tank;
a low pressure fuel pump;
a high pressure fuel pump; and
a fuel injector directly injecting fuel into a combustion chamber; and
a control system including executable instructions stored in non-transitory memory to mix a cetane enhancer stored in the cetane enhancer storage tank with diesel fuel stored in the diesel fuel storage tank to provide a cetane enhanced diesel fuel, and instructions to pump the cetane enhanced diesel fuel from the low pressure fuel pump to the high pressure fuel pump in response to an engine start request.

10. The engine system of claim 9, further comprising additional instructions to estimate a catalyst temperature at a time of a next engine start after an engine stop.

11. The engine system of claim 10, further comprising additional instructions to mix the cetane enhancer with the diesel fuel in response to the estimated catalyst temperature at the time of the next engine start being less than a threshold; and
additional instructions to command one or more fuel injectors with a fuel pulse width that is too short in duration to open the fuel injector so that diesel fuel is returned to the diesel fuel storage tank.

12. The engine system of claim 9, further comprising additional instructions to inject the cetane enhanced diesel fuel via the fuel injector, and
additional instructions to adjust fuel injection timing in response to an estimate of when the cetane enhanced diesel fuel is injected to an engine cylinder, the estimate based on a volume of fuel injected and a fuel system volume.

13. The engine system of claim 9, further comprising additional instructions to advance fuel injection timing while injecting the diesel fuel stored in the diesel fuel storage tank during an engine start.

* * * * *